UNITED STATES PATENT OFFICE.

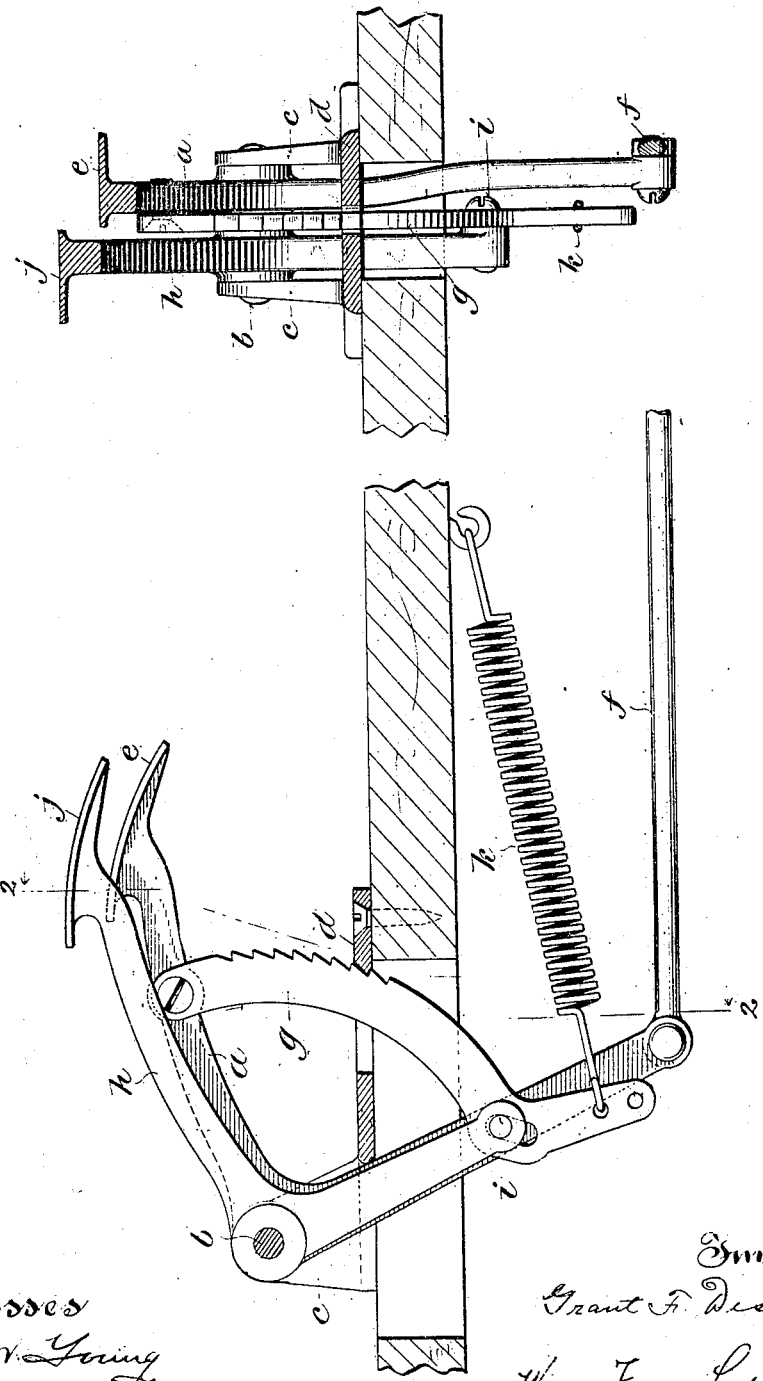
No. 837,043. PATENTED NOV. 27, 1906.
G. F. DISCHER.
SELF-LOCKING PEDAL.
APPLICATION FILED MAR. 3, 1905.

GRANT F. DISCHER, OF MILWAUKEE, WISCONSIN.

SELF-LOCKING PEDAL.

No. 887,043.

Specification of Letters Patent.

Patented Nov. 17, 1908.

Application filed March 9, 1906. Serial No. 248,263.

*To all whom it may concern:*

Be it known that I, GRANT F. DISCHER, a citizen of the United States, residing at Milwaukee, in the county of Milwaukee and State of Wisconsin, have invented certain new and useful Improvements in Self-Locking Pedals, of which the following is a specification, reference being had to the accompanying drawings, forming a part thereof.

This invention relates to pedals or foot-levers for operating valves, brakes, &c. Its main object is to provide for releasing the locking device and automatically locking the pedal in any desired position by a simple side movement or turning of the foot which operates the pedal and for holding the locking device out of action in the normal operation of the pedal by the foot.

It consists in certain novel features of construction and in the peculiar arrangement and combination of parts, as hereinafter particularly described, and defined in the claims.

In the accompanying drawings like letters designate the same parts in both figures.

Figure 1 is a side elevation and partial vertical section of a pedal embodying my invention; and Fig. 2 is a cross-section of the same on the line 2 2, Fig. 1.

For the purpose of illustration I have shown and will particularly describe a form of the device which is specially designed for attachment to the footboard of an automobile and for operating the throttle or other valve of the engine or motor of such a vehicle. The device is, however, susceptible of modification in various ways and is applicable to different uses without departing from the principle of the invention.

Referring to the drawings, $a$ is an angular foot-lever fulcrumed at its elbow on a pin $b$, which is secured at the ends in upturned ears $c$ on a base or attachment plate $d$. At its upper end this lever is formed with an expanded toe-piece $e$, and at its other end it is connected by a rod $f$ with a valve or other device which is to be operated by the pedal. A ratchet-bar $g$, pivoted at its upper end to the lever $a$, passes downwardly therefrom through an opening in the base-plate $d$ and is curved to an arc of a circle having a radius corresponding in length with the distance between the fulcrum-pin $b$ of said lever and the upper end of said ratchet-bar.

An angular arm or lever $h$, in the present case corresponding approximately with the lever $a$ in shape, is fulcrumed on the same pin $b$ and is connected at its lower end with the ratchet-bar $g$ by a screw or pin $i$ passing through a slot in said bar. At its upper end the arm or lever $h$ is formed with an expanded toe-piece $j$, corresponding with that on the lever $a$.

A spring $k$, connecting the lower end of the ratchet-bar $g$ with a fixed support, such as the footboard to which the base-plate $d$ is attached, tends to retract the pedal and to draw and hold the ratchet-bar $g$ in engagement with one edge of the opening in the base-plate $d$, which serves, as shown in Fig. 1, as a relatively stationary locking-piece. Normally the toe-piece $j$ of the pedal-releasing arm $h$ is held by the retracting-spring $k$ above or in advance of the toe-piece $e$ on the lever $a$ or in position to be first engaged by the foot of the operator. The slot on the ratchet-bar $g$, with which the screw or pin $i$ on the releasing-arm $h$ engages, is so formed and arranged as to permit a limited movement of the releasing-arm independently of the lever $a$ and then cause the two parts to move together as one.

The depression of the toe-piece $j$ on the releasing-arm $h$ by the foot of the operator carries and holds the ratchet-bar $g$ out of engagement with the base-plate $d$. The lever $a$ is thus left free to be moved in one direction by the foot of the operator and in the opposite direction by the retracting-spring $k$, the toe-pieces $e$ and $j$ on the lever $a$ and arm $h$ being held side by side with the foot. By swinging or turning the foot to the right, and thereby releasing the toe-piece $j$ of the arm $h$, the spring $k$ is permitted to draw the ratchet-bar $g$ into engagement with the base-plate $d$ and lock the pedal in any desired position. Upon turning the foot back to its original position or by depressing the toe-piece $j$ to the level of the toe-piece $e$ the pedal is released and may be freely turned, as before, in either direction.

By the construction and arrangement of parts herein shown and described a single spring serves both to retract the pedal or foot-lever $a$ when the toe-piece $j$ of the pivoted arm $h$ is depressed and to engage the ratchet-bar $g$ with the base-plate of the pedal when the toe-piece of said arm is released.

I claim—

1. In a self-locking pedal the combination of a foot-lever, a ratchet-bar pivoted thereto, a locking-piece with which said ratchet-bar is adapted to be engaged for holding said lever in different positions, a spring normally holding said ratchet-bar in engagement with said locking-piece, and a releasing-arm connected with said ratchet-bar and standing normally in advance of said lever, substantially as described.

2. In a self-locking pedal the combination of a foot-lever, a locking-piece, a ratchet-bar pivoted to said lever, a spring tending to retract said lever and to hold said bar in engagement with said locking-piece, and a releasing-arm capable of a limited movement independently of said lever for disengaging said bar from the locking-piece, substantially as described.

3. In a self-locking pedal the combination of a foot-lever, a locking-piece, a curved ratchet-bar pivoted to said lever, a spring tending to engage said bar with said locking-piece, and an arm connected with said bar and standing normally in advance of said lever for and adapted by movement toward said lever to disengage said bar from said locking-piece, substantially as described.

4. In a self-locking pedal the combination of a foot-lever having a toe-piece at one end, a stationary locking-piece, a ratchet-bar pivoted to said lever, a spring tending to hold said ratchet-bar in engagement with said locking-piece, and a pivoted arm connected with said ratchet-bar and having a toe-piece adjacent to the toe-piece of said lever and held normally in advance thereof by said spring, said arm being arranged when its toe-piece is moved toward the toe-piece on said lever to disengage said ratchet-bar from said locking-piece substantially as described.

5. In a self-locking pedal the combination of a foot-lever, a stationary locking-piece, a ratchet-bar pivoted to said lever, a spring tending to hold said ratchet-bar in engagement with the locking-piece, and a pivoted arm movable with and to a limited extent independently of said lever and connected with said ratchet-bar, said arm being adapted by its initial movement independently of and toward said lever to disengage the ratchet-bar from the locking-piece, substantially as described.

In witness whereof I hereto affix my signature in presence of two witnesses.

GRANT F. DISCHER.

Witnesses:
CHAS. L. GOSS,
BERNARD C. ROLOFF.